: US 11,353,773 B2
(45) Date of Patent: Jun. 7, 2022

(12) United States Patent
Fendel

(10) Patent No.

(54) MICROJOULE AMPLIFIER SYSTEM FOR THREE PHOTON MICROSCOPY UTILIZING EXISTING FEMTOSECOND LASERS USED FOR TWO PHOTON MICROSCOPY AS A SEED SOURCE

(71) Applicant: Thorlabs, Inc., Newton, NJ (US)

(72) Inventor: Peter Fendel, Sparta, NJ (US)

(73) Assignee: Thorlabs, Inc., Newton, NJ (US)

(*) Notice: Subject to any disclaimer, the term of this patent is extended or adjusted under 35 U.S.C. 154(b) by 332 days.

(21) Appl. No.: 16/593,839

(22) Filed: Oct. 4, 2019

(65) Prior Publication Data

US 2020/0112138 A1 Apr. 9, 2020

Related U.S. Application Data

(60) Provisional application No. 62/741,930, filed on Oct. 5, 2018.

(51) Int. Cl.
*G02F 1/39* (2006.01)
*G02F 1/35* (2006.01)
(Continued)

(52) U.S. Cl.
CPC ............. *G02F 1/39* (2013.01); *G02F 1/3532* (2013.01); *G02F 1/392* (2021.01); *H01S 3/0092* (2013.01); *H01S 3/06741* (2013.01)

(58) Field of Classification Search
CPC ...... G02F 1/3532; G02F 1/39; H01S 3/06741; H01S 3/08086; H01S 3/1003
See application file for complete search history.

(56) References Cited

U.S. PATENT DOCUMENTS 7,787,175 B1 * 8/2010 Brennan, III ...... B23K 26/0624
359/333
8,023,538 B2 * 9/2011 Marcinkevicius ........ G02F 1/39
372/25

(Continued)

FOREIGN PATENT DOCUMENTS

EP 1873876 A1 1/2008
WO 2005/094275 A2 10/2005

OTHER PUBLICATIONS

Notification of Transmittal of the International Search Report and The Written Opinion of the International Searching Authority issued for corresponding International Patent Application No. PCT/US2019/054855, dated Jan. 16, 2020.

*Primary Examiner* — Daniel Petkovsek
(74) *Attorney, Agent, or Firm* — Myers Wolin, LLC

(57) ABSTRACT

Disclosed are ideas to produce an add-on device which turns widely used high repetition rate lasers used for 2-photon microscopy into a light source which can be used for 3-photon microscopy. The add-on encompasses a device to reduce the pulse repetition rate of the high repetition rate (>50 MHz) laser source (laser or OPO) to less than 10 MHz which allows for higher pulse energies while maintaining reasonable average powers. If the high repetition sources operate below 1250 nm the add-on shifts or broadens the seed light to cover 1.3 µm to 1.8 µm before amplification. If the high repetition rate source operates at or around 1.3 µm the add-on only needs to amplify the pulse after downshifting the repetition rate. In another implementation the add-on shifts or broadens the 1.3 µm light to cover the spectral range out to 1.8 µm before amplification.

5 Claims, 1 Drawing Sheet

(51) Int. Cl.
  *H01S 3/067* (2006.01)
  *H01S 3/00* (2006.01)

(56) References Cited

U.S. PATENT DOCUMENTS

| | | | |
|---|---|---|---|
| 8,040,929 B2* | 10/2011 | Imeshev | G02F 1/39 |
| | | | 372/21 |
| 9,550,069 B1* | 1/2017 | Elezzabi | A61F 9/00825 |
| 2005/0265407 A1* | 12/2005 | Braun | H01S 5/4006 |
| | | | 372/30 |
| 2008/0056642 A1* | 3/2008 | Byer | G02B 6/4296 |
| | | | 385/27 |
| 2008/0089366 A1* | 4/2008 | Liu | H01S 3/2316 |
| | | | 372/6 |
| 2011/0002691 A1* | 1/2011 | Lin | H01S 3/0675 |
| | | | 398/118 |
| 2016/0099540 A1 | 4/2016 | Chuang et al. | |

* cited by examiner

MICROJOULE AMPLIFIER SYSTEM FOR THREE PHOTON MICROSCOPY UTILIZING EXISTING FEMTOSECOND LASERS USED FOR TWO PHOTON MICROSCOPY AS A SEED SOURCE

CROSS REFERENCES TO RELATED APPLICATIONS

This application claims the benefit of U.S. Provisional Patent Application No. 62/741,930 filed on Oct. 5, 2018. The disclosure and entire teachings of U.S. Provisional Patent Application 62/741,930 are hereby incorporated by reference.

FIELD OF THE INVENTION

This invention relates generally to amplifier system for multi-photon microscopy, and more particularly to a microjoule amplifier system for three-photon microscopy utilizing existing femtosecond lasers used for two-photon microscopy as a seed source.

BACKGROUND

In the lifesciences, fluorescence microscopy is used to study biological samples like individual cells or complex structures like the brain. Scattering in these samples limits the imaging depth. It is generally true that light with longer wavelength is scattered less in tissue hence allowing it to penetrate deeper into e.g., the brain. Two-photon (2p) microscopy makes use of this and allows imaging about 1 mm deep into e.g., the brain. In two-photon microscopy, the wavelength needed to excite a fluorophore or fluorescent protein is doubled compared to single photon excitation as e.g., used in confocal microscopy. Three-photon (3p) microcopy takes this approach one step further by using even longer wavelength light. The downside of going from single to two- to three-photon excitation is that the probability of such an event happening becomes less and less likely and hence requires higher laser intensity. For 3p microcopy, μJ laser pulses producing Megawatt of peak power are required. Systems capable of producing these peak power levels are expensive and operate with low repetition rates.

Most scientists, however, need, besides the 3p imaging capability, the ability to do 2-photon imaging in order to acquire images at a high frame rate to capture dynamic processes. 3p is only needed when they need to go deep into the sample. A 2p laser is a workhorse in most neuroscience lab. An inventive idea behind this disclosure is to produce a device which can be used in conjunction with a ubiquitous 2p light source to produce light pulses in the μJ regime.

SUMMARY

Disclosed are ideas to produce an add-on device which turns widely used high repetition rate lasers used for 2p microscopy into a light source which can be used for 3p microscopy. The add-on encompasses a device to reduce the pulse repetition rate of the high repetition rate (>50 MHz) laser source (laser or OPO) to less than 10 MHz which allows for higher pulse energies while maintaining reasonable average powers. If the high repetition sources operate below 1250 nm the add-on shifts or broadens the seed light to cover 1.3 μm to 1.8 μm before amplification. If the high repetition rate source operates at or around 1.3 μm the add-on might only need to amplify the pulse after down-shifting the repetition rate. In another implementation the add-on shifts or broadens the 1.3 μm light to cover the spectral range out to 1.8 μm before amplification.

The novelty here is that this add-on system turns a generic 2p laser system into a 3p laser system hence providing unique value to the customers as they can enjoy the benefit of both techniques.

In one embodiment, the present invention provides an amplifier system, including: an optical parametric oscillator (OPO) producing light pulses with a first repetition rate; a pulse picking device configured to reduce the pulses from the first repetition rate to a second repetition rate; a pulse stretching module configured to increase the pulse duration of the pulses from the pulse picking device; an amplifier configured to provide gains to the longer duration pulses; and a pulse compressing module configured to reduce the pulse duration of the amplified pulses.

In one embodiment, the present invention provides an amplifier system, including: a femtosecond laser outputting light pulses with a first repetition rate; a wavelength shifting module configured to shift or broaden the wavelength of the light pulses; a pulse picking device configured to reduce the pulses from the first repetition rate to a second repetition rate; and a pulse stretching module configured to increase the pulse duration of the pulses from the pulse picking device; an amplifier configured to provide gains to the longer duration pulses; and a pulse compressing module configured to reduce the pulse duration of the amplified pulses.

DETAILED DESCRIPTION OF THE PREFERRED EMBODIMENTS

Figure 1:
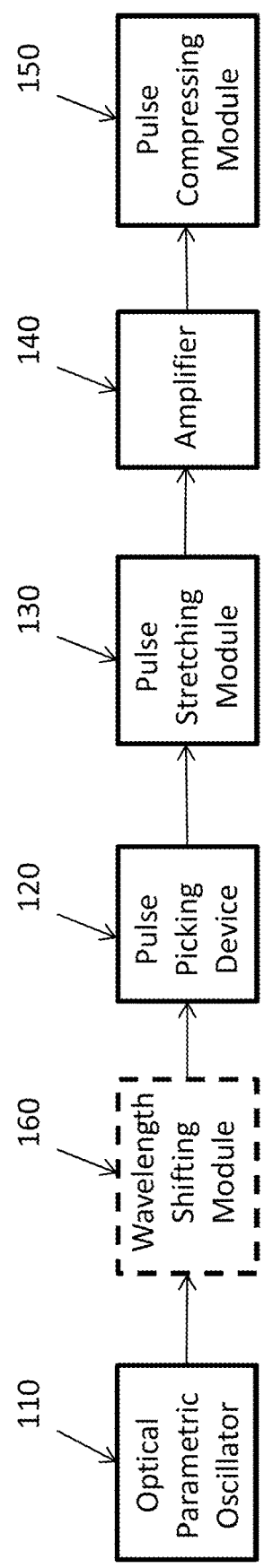
FIG. 1 is a block diagram of an amplifier system according to an embodiment of the invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The first idea presented here is to use existing Optical Parametric Oscillator based, high repetition rate (>50 MHz) femtosecond sources as a seed source for a lower repetition rate amplifier producing pulse energies on the order of micro Joule, capable of amplifying several 10 nm of bandwidth and operating between 1250 nm and 1800 nm. As shown in FIG. 1, a device reducing the pulse repetition rate 120 is placed in between the OPO 110 and the amplifier 140. This device could be a Pockels cell or an acousto-optic modulator (AOM). The pulse picking device 120 is followed by a pulse stretching module 130 which increases the pulse duration in a reversible fashion from the femtosecond regime to the picosecond (1 to 1000 ps) time scale in order to reduce the peak power of the laser pulse. The module 130 is followed by one or multiple amplifier stages 140. The amplifier stages could be based on fiber, fiber rods, bulk glass or crystal. The gain process could be parametric or non-parametric. The amplifier stage(s) 140 is/are followed by a pulse compressing module 150 which reduces the pulse duration again down to the femtosecond scale. An optional wavelength shifting module 160 may be placed between the OPO 110 and the pulse picking module 120.

In another embodiment the compression can have the ability to over compensate so the output pulse is negatively chirped, i.e., higher frequencies are in the leading edge of the pulse. The purpose would be to pre-compensate the dispersion in the 3p microscope.

In another embodiment the original seed light from the OPO is either spectrally broadened in a highly non-linear fiber or frequency shifted to cover the 1700 nm to 1800 nm spectral region before amplification. The broadening could happen after or before changing the repetition rate.

Figure 2:
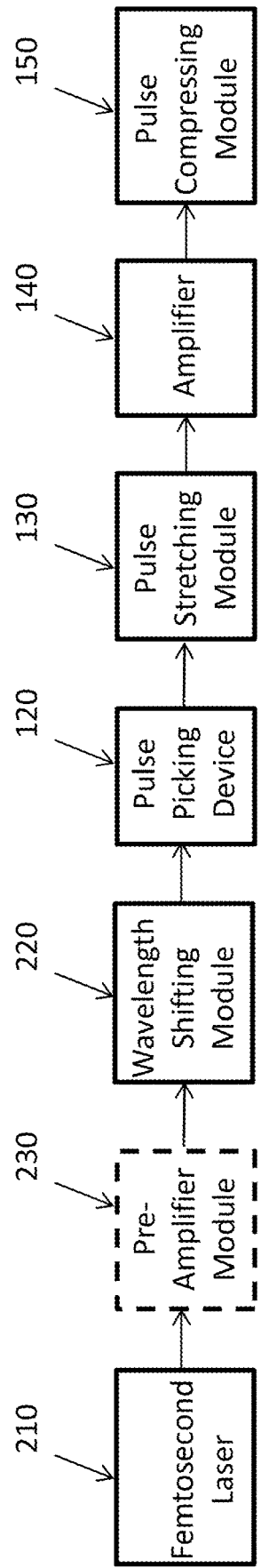
FIG. 2 is a block diagram of an amplifier system according to another embodiment of the invention.

As shown in FIG. 2, the second idea proposed is to make use of a femtosecond laser 210 operating below 1.2 µm as a seed source for the µJ amplifier system. Therefore, the wavelength of the high repetition rate source needs to be shifted or broadened by a wavelength shifting module 220 to cover the spectral range of 1250 to 1800 nm. An optional preamplifier module 230 may be placed between the femtosecond laser 210 and the wavelength shifting module 220. The broadening could or could not require additional pre-amplification. In one implementation a photonic crystal fiber (PCF) could be used to broaden the spectrum to cover the desired range. The pulse picking device could be place before or after the broadening stage. The output of the PCF could benefit from spectral filtering to optimize the overlap with the gain spectrum. The seed light might or might not go to the pulse stretching module before entering the amplification stages described above.

In another implementation the light of the high repetition rate source is frequency shifted via nonlinear processes like Raman shifting before it is used as seed pulse. After the frequency shifting, the light might or might not go to the pulse stretching module before entering the amplification stages described above.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An amplifier system, comprising:
    an optical parametric oscillator (OPO) producing femtosecond duration light pulses with a first repetition rate greater than 50 MHz and tuning range between 650 nm to 1400 nm and an average power of >1 W at the peak of the tuning range;
    a pulse picking device configured to reduce the pulses from the first repetition rate to a second repetition rate less than 10 MHz;
    a pulse stretching module configured to increase the pulse duration of the pulses from the pulse picking device to picosecond duration pulses;
    an amplifier configured to provide gains to the longer duration pulses; and
    a pulse compressing module configured to reduce the pulse duration of the amplified pulses to femtosecond duration pulses;
    wherein the system generates pulse energies on the order of micro Joule, capable of amplifying several 10 nm of bandwidth and operating between 1250 nm and 1800 nm.

2. The amplifier system of claim 1, wherein the pulse picking device is a Pockels cell or an acousto-optic modulator (AOM).

3. The amplifier system of claim 1, wherein the amplifier comprises one or more amplifier stages.

4. The amplifier system of claim 1, wherein the pulse compressing module is configured to compress the pulses to output a pulse that is negatively chirped.

5. The amplifier system of claim 1, wherein the light pulses from the OPO is either spectrally broadened in a highly non-linear fiber or frequency shifted to cover the 1700 nm to 1800 nm spectral region.

* * * * *